United States Patent Office 3,620,136
Patented Nov. 16, 1971

3,620,136
FLUID SEALS
Charles Brian Weatherhogg, Birmingham, England, assignor to Girling Limited, Birmingham, England
Filed Aug. 13, 1969, Ser. No. 849,756
Claims priority, application Great Britain, Aug. 21, 1968, 39,974/68
Int. Cl. F01b 7/00
U.S. Cl. 92—151
5 Claims

ABSTRACT OF THE DISCLOSURE

A tandem servo motor housing is provided which comprises a pair of separate cells having end walls which are secured together to form a composite unit, the end walls constituting a partition dividing the interior of the composite housing into two separate chambers. The end walls have portions which are spaced slightly from one another to define an axially situated and generally annular space serving to receive an annular fluid seal. The fluid seal preferably comprises an annular body portion, a pair of axially spaced and generally radially directed lips located adjacent the periphery of said body portion, and a radially inner and generally axially directed lip which defines the inner margin of the body portion.

---

Figure 1:
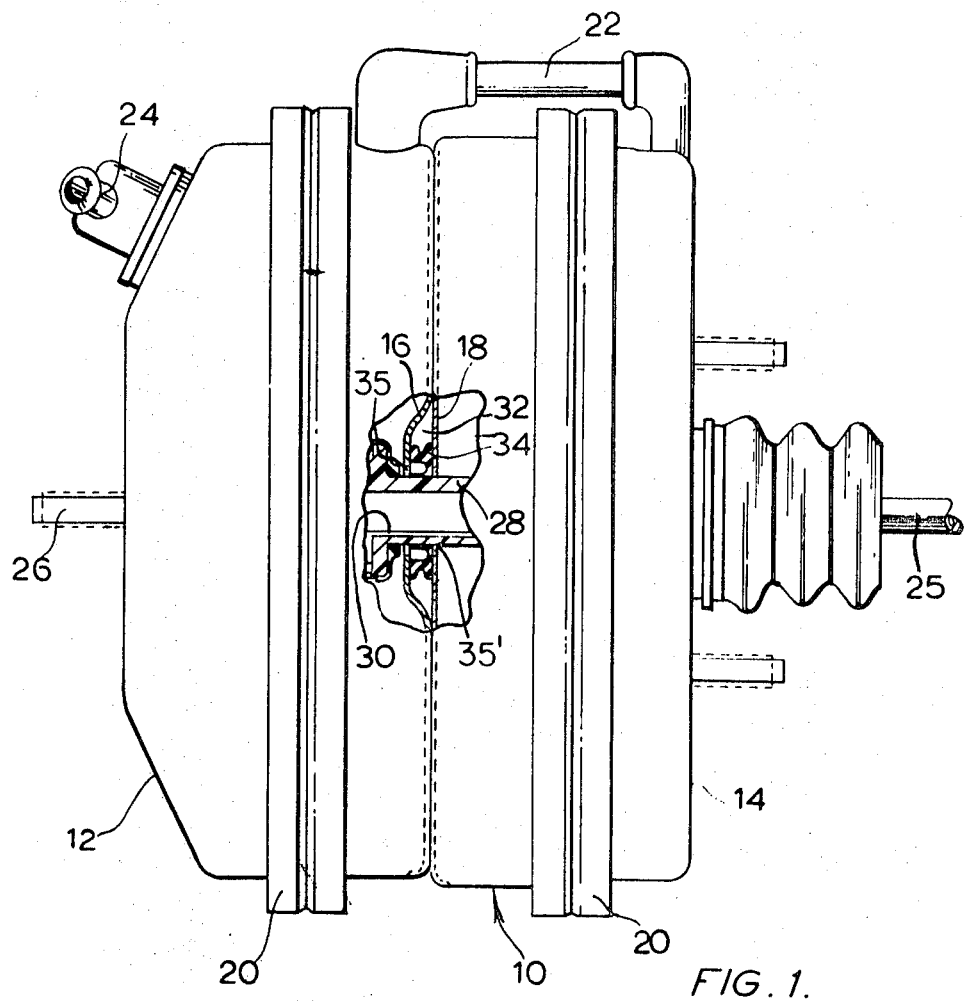

This invention relates to servo motors and particularly to fluid seals for the use in fluid pressure boosters or servo motors. The invention is especially useful in connection with so-called tandem fluid pressure boosters or servo motors.

A common construction of fluid pressure servo motor employs two separate pistons or diaphragms located in a common housing on opposite sides of a stationary partition which divides the housing interior into a pair of chambers, each diaphragm co-operating with the common housing to divide the chamber in which it is itself situated into a pair of compartments capable of being subjected to different fluid pressures to displace the diaphragm, the diaphragm movement being applied in operation to a common output member which is usually the piston of a hydraulic master cylinder.

As a result of the requirements it is called upon to fulfil, the stationary partition in a fluid servo motor of the type described immediately above is a rather expensive item, generally taking the form of a phenolic moulding. The invention accordingly seeks to provide a tandem servo motor housing construction which avoids the need for such a partition and which is therefore less expensive.

According to one feature of the present invention, a tandem servo motor housing comprises a pair of separate cells having end walls which are secured together to form a composite unit, said end walls constituting a partition for dividing the interior of the composite housing into two separate chambers.

By virtue of the elimination of the separate stationary partition in a servo motor housing constructed in accordance with the invention, the housing may be made of more compact shape and dimensions than hitherto. One of the tandem diaphragms is arranged in each of the cells to divide the interior of that cell into the aforementioned differential compartments and the two diaphragms are conveniently coupled together by an axially directed sleeve through which the common output member passes. The sleeve is preferably made of a phenolic material.

In order to render the two centre compartments of the housing fluidtight with respect to one another and to the external atmosphere at the position where the sleeve passes through the end walls, the latter are conveniently spaced slightly from one another to define an axially situated and generally annular space serving to receive a fluid seal which engages both said sleeve and the separated wall portions.

According to another feature of the invention, a preferred annular seal for use in the annular space between the separated wall portions comprises a pair of axially spaced and radially directed lips and a radially inner and axially directed lip which defines the inner margin of the seal.

In use, with the seal proposed by the invention installed in the annular space between the separated wall portions and those wall portions apertured to permit a limited amount of free radial movement to the sleeve for self alignment of the common output member, the radially directed lips seal against said wall portions and the axially directed lip engages the sleeve. In the more usual case of a so-called vacuum suspended servo motor, for example, when the motor is at rest with all its differential pressure compartments connected to the vacuum, the radial lips are forced by atmospheric pressure into sealing engagement against said wall portions while in the energised condition of the motor the axially directed lip is pressed into firmer engagement with the sleeve owing to the pressure differential between the contiguous centre compartments.

Figure 2:
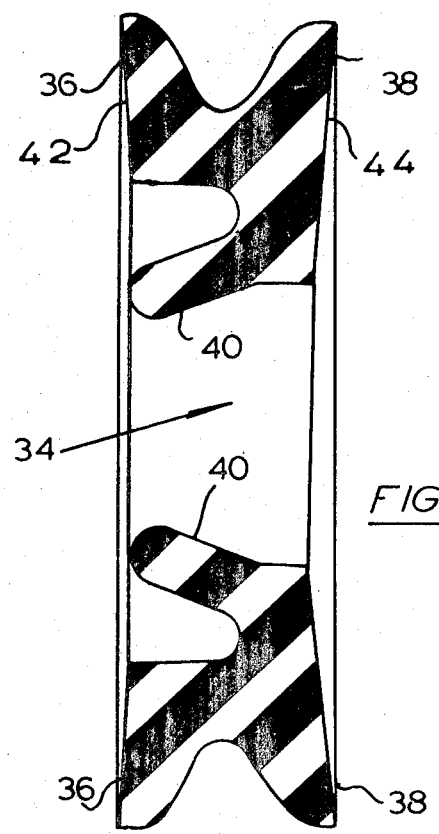

The invention will be described further, by way of example, with reference to the accompanying drawings, in which:

FIG. 1 is an elevation partly in section of a servo motor embodying the invention, and FIG. 2 is a sectional side elevation of one embodiment of an annular seal constructed in accordance with the invention.

As shown in FIG. 1, the servo motor includes a housing generally designated 10 and made up from two initially separate cells 12 and 14 serving as a slave and master unit respectively and having their axial end walls 16 and 18 welded together. For ease of assembly, each of the cells 12 and 14 is itself made in two parts in conventional manner and those two parts are secured together in the usual way by means of locking rings 20. Each ring 20 serves simultaneously to engage in fluidtight sealing relation between the two parts of the associated cell, a thickened annular bead of a diaphragm (not shown) located in a respective one of the cells 12 and 14, each diaphragm dividing its cell into a front and rear chamber. An external pipe 22 interconnects the rear chambers of the cells 12 and 14. A non return valve 24 is located on the front chamber of the cell 12 to enable this chamber to be connected to a source of vacuum, for example, an engine manifold.

The cell 14 contains a valve operating gear (not shown) by means of which the servo motor may be energised in response to movement of a pedal operated input rod 25 by metering atmospheric air to the rear chamber of the cell 14, and, via the external pipe 22 to the rear chamber of the cell 12. A force generated by a pressure responsive wall within the master unit 14 is transmitted to an output rod of the servo motor via a phenolic sleeve 28 which embraces part of the output rod and additionally serves to provide a permanently open communication between the front chambers of the units 12 and 14 by means of a vacuum passage 30. Reference numeral 26 indicates a mounting bolt for the housing 10.

The end walls 16 and 18 of the cells 12 and 14 are arranged to define an annular space 32 therebetween in which is located an annular seal 34, of moulded oil-resistant rubber, which embraces the phenolic sleeve 28.

The seal 34 (see FIG. 2) has a pair of radially directed lips 36 and 38 adjacent its outer diameter and an axially directed lip 40 defining its radially inner margin.

The radially directed lips 36 and 38 are biased outwards in an axial direction so as to be in compression when located between the surfaces of the walls 16 and 18 defining the space 32. The axially directed lip 40 is biassed in a radially inward direction towards the centre of the seal so as to form a tight fit when mounted on the phenolic sleeve 28. The walls 16 and 18 are apertured in the region of the seal 34 with substantially co-axial openings 35, 35' of greater diameter than the sleeve as shown, to enable the sleeve to pass into the slave unit with the clearance provided by the openings allowing a limited amount of free radial movement to the sleeve for alignment purposes.

When the servo motor is unactuated with all its chambers connected to the source of vacuum, the radially directed lips 36 and 38 are urged by atmospheric pressure into sealing engagement with a respective wall 16, 18. The resulting compression on the respective vertical faces 42 and 44 of the radially directed lips 36 and 38 ensures that a substantially constant force is applied to these vertical surfaces, thus allowing the seal to move in an eccentric manner and still maintain a sealing surface. When the servo motor is energised the axially directed lip 40 is pressed into greater sealing contact with the phenolic sleeve 28 due to the greater pressure in the rear chamber of the slave unit 12.

I claim:

1. A tandem servo motor comprising two fluid pressure motor housings joined together at adjacent end walls, two mutually facing central portions of said adjacent walls being spaced axially apart to define between them a central annular chamber, substantially co-axially aligned openings through the spaced apart wall portions defining said chamber, an axially movable sleeve of less cross-sectional dimension than said openings extending through said chamber and said openings, and an annular seal located in said chamber and constructed and arranged so as to have a degree of radial movement within said chamber, said seal having first and second sealing surfaces engaging said two mutually facing spaced apart wall portions, respectively, of said chamber, and a third sealing surface embracing said sleeve, said seal being movable with said sleeve in a radial direction without impairing the sealing action of said seal either with said sleeve or the walls of said chamber.

2. A tandem servo motor housing according to claim 1 in which the seal comprises an annular body portion, a pair of axially spaced and generally radially directed lips located adjacent the periphery of said body portion, and a radially inner and generally axially directed lip which defines the inner margin of the body portion.

3. A tandem servo motor housing according to claim 2 in which the axially spaced and generally radially directed lips are biassed outwardly in an axial direction so as to be in compression when located between the surfaces of the walls defining said annular space.

4. A tandem servo motor housing according to claim 3 in which the generally axially directed lip is biassed in a radially inward direction so as to form a tight fit when mounted on said sleeve.

5. A tandem servo motor housing according to claim 1 in which the annular seal is moulded from oil resistant rubber.

References Cited
UNITED STATES PATENTS

| | | | |
|---|---|---|---|
| 1,229,216 | 6/1917 | Boyd | 92—168 X |
| 1,898,623 | 2/1933 | Gammeter | 277—72 X |
| 2,157,983 | 5/1939 | Glougie | 277—71 X |
| 2,164,857 | 7/1939 | MacClathie | 277—71 X |
| 3,020,094 | 2/1962 | Murty et al. | 92—63 X |
| 3,090,359 | 5/1963 | Hoppenstand | 92—64 X |
| 3,189,360 | 6/1965 | Haberkorn | 277—205 |
| 3,292,502 | 12/1966 | Myers et al. | 92—48 |

MARTIN P. SCHWADRON, Primary Examiner

L. J. PAYNE, Assistant Examiner

U.S. Cl. X.R.

92—62, 168; 277—205, 206